UNITED STATES PATENT OFFICE.

CHARLES F. COOPER, OF CLEVELAND, OHIO.

COMPOSITION OF MATTER FOR FINISHING WOOD.

1,169,930.　　　　　Specification of Letters Patent.　　Patented Feb. 1, 1916.

No Drawing.　　　Application filed June 5, 1913. Serial No. 771,958.

*To all whom it may concern:*

Be it known that I, CHARLES F. COOPER, a citizen of the United States, residing at Cleveland, in the county of Cuyahoga and State of Ohio, have invented a new and useful Composition of Matter for Finishing Wood, of which the following is a specification.

My composition of matter is both a filler and graining ground and consists, preferably, of the following ingredients, combined in substantially the proportions stated, viz.: fifty per cent. (50%) zinc white, forty per cent. (40%) pigment (variant dry color), five per cent. (5%) shellac gum, four and nine-tenths per cent. ($4\frac{9}{10}$%) alcohol. Optional: one-tenth per cent. ($\frac{1}{10}$%) any tar product or sal soda. These ingredients are to be thoroughly mingled by agitation.

I find that either white lead or in certain cases chemical equivalents of both zinc white and dry lead will produce equally satisfactory results as does the employment of zinc white stated in the above formula. For certain work, a combination of two or more equivalents (aggregating together approximately fifty per cent. (50%) of this "body" forming ingredient or covering, is also possible. For example, in enamel work and for fine graining ground purposes such as in the case of light oak, I find it best to use both zinc white and white lead in nearly equal quantities.

It is possible to use as a pigment either pumice stone, litharge, marble dust or yellow ocher, depending of course upon the color desired.

In place of the shellac gum the following may be used: banana oil, ordinary shellac solution, or less satisfactorily, common glue, the latter of which is often found mixed with the cheaper shellac gums.

For the alcohol, which is adapted to "cut" or separate the compound and act as a vehicle, either benzol or ether or some of each may be substituted.

Mention should be made that the one-tenth per cent. ($\frac{1}{10}$%) of either sal soda or any tar product stated in the formula above is not essential to the efficacy of my preparation. I simply prefer to use one or the other and sometimes both of these. When neither of them is present as an ingredient, the one-tenth per cent. ($\frac{1}{10}$%) is added to the quantity of alcohol used. The purpose of either the sal soda or any tar product or gum camphor is primarily to cause the mixture to "slip" easily and incidentally to supply a perfume along with the alcohol, benzol, or ether as the case may be. I generally use a tar product, save in enamel work where the use of sal soda together with a little water is preferable because the tar product would make the finish yellow or otherwise darken it.

The great commercial advantage of my filler and graining ground resides in this that it permits a piece of work to be finished in an astoundingly smaller period of time and with the production of results in every way as satisfactory and for inside work of even superior grade. Heretofore, in so far as I am aware, when "fillers" known to the market had been applied and after a short interval rubbed off, it was required that they be allowed to become thoroughly dry which consumed as a rule no less than twenty-four hours. In the case of my inventive composition, the subsequent finishing improvement may be undertaken, with certainty within an hour after its application.

The fillers with which the art is conversant today should not be permitted to dry as a coat but must be rubbed off from five to ten minutes after they have been applied and thereafter, of these only so much as has filled the pores of the wood is permitted to thoroughly dry requiring however as just stated no less than twenty-four hours. The entire coat of my inventive composition, as contradistinguished, is permitted to dry. In the case of soft woods it may either be left in this condition and finished to a polish by the application of a varnish, or scraped and supplied with some artificial grain.

In the case of hard woods, such as oak, my composition would be applied with the inclusion of a little color, then allowed to dry and finally, after no more than an hour's time, surfaced with sandpaper used in conjunction with oil or turpentine. Thereafter, the work may be stained and shellacked to bring out the color of the wood.

My inventive preparation is principally adapted in the way of durability for inside work where it lends better color. If intended to be applied in the open air and subjected to inclement weather it must be protected by a good solid lead paint. Consonantly when used upon soft wood indoors it is in effect itself an alcohol paint. Its quick drying quantities commend its use also for the retouching of old painted interior woods which after being sponged with sal soda may be entirely finished with a single coat.

It is usually best to effect the mixing of my preparation in the following order. First cut the shellac gum which is usually in lump or powdered form with alcohol or some equivalent, next add the tar product the simultaneous cutting of which is facilitated add benzol and lastly by adding the dry color and zinc white or its equivalent. Finally the proper consistency may be effected by adding additional alcohol. As a filler it is best to have it thinner than as a paint. If desired flour paste (starch) may be added to assist in binding the alcohol.

This invention permits of use also in the artificial graining of metal. In such case a distinct preparation must however first be applied as a binder before my graining ground can be used.

My invention being thus described with sufficient thoroughness, what I desire to secure by Letters Patent and therefore claim specifically, is:

1. The herein described composition of matter for the manufacture of a wood finishing compound, comprising fifty per cent. zinc white, forty per cent. pigment (dry color), five per cent. shellac gum, and five per cent. alcohol.

2. The herein described composition of matter for the manufacture of a wood finishing compound, comprising about ninety per cent. of zinc white and any dry color in nearly equal parts, mixed with the remaining per cent. as a mixture of shellac and alcohol.

3. The herein described composition of matter comprising approximately equal parts of a body-forming ingredient and a pigment, mixed with approximately equal parts of shellac and alcohol, the proportion of the parts being substantially as specified.

Signed by me, this 24th day of May, 1913.

CHARLES F. COOPER.

Attested by—
    CON C. COOPER,
    HELEN N. HINE.

Copies of this patent may be obtained for five cents each, by addressing the "Commissioner of Patents, Washington, D. C."